United States Patent [19]

Omura et al.

[11] Patent Number: 4,935,500
[45] Date of Patent: Jun. 19, 1990

[54] METALLIZED FORMAZAN COMPOUNDS HAVING TWO FIBER REACTIVE GROUPS LINKED BY N-ALKYL-CONTAINING GROUP

[75] Inventors: Takashi Omura, Ashiya; Katsumasa Otake, Nara; Kaneo Yokoyama, Nara; Yasuo Tezuka, Nara, all of Japan

[73] Assignee: Sumitomo Chemical Company, Limited, Osaka, Japan

[21] Appl. No.: 513,663

[22] Filed: Jul. 14, 1983

[30] Foreign Application Priority Data

Jul. 19, 1982 [JP] Japan .................. 57-126532

[51] Int. Cl.$^5$ .............. C09B 62/04; C09B 62/503; D06P 3/66; D06P 1/38
[52] U.S. Cl. .................. 534/618; 534/652
[58] Field of Search ............ 260/146 T, 153, 148; 534/618

[56] References Cited

FOREIGN PATENT DOCUMENTS

| | | | |
|---|---|---|---|
| 0021351 | 1/1981 | European Pat. Off. ............ | 534/618 |
| 2557141 | 7/1976 | Fed. Rep. of Germany ...... | 534/618 |
| 2437426 | 4/1980 | France .................. | 534/638 |
| 2026527 | 2/1980 | United Kingdom ............ | 534/638 |

Primary Examiner—Floyd D. Higel
Attorney, Agent, or Firm—Stevens, Davis, Miller & Mosher

[57] ABSTRACT

A reactive metal formazan blue dye represented by a free acid of the formula,

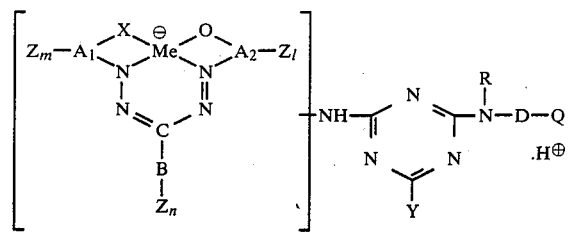

wherein $A_1$ and $A_2$ are independently a substituted or unsubstituted phenylene or naphthylene group, B is a straight or branched alkyl or alkenyl group, a phenyl group, a naphthyl group or a heterocyclic group, the alkyl, alkenyl, phenyl, napthyl and heterocyclic group being substituted or unsubstituted, Me is an ion of metal identified by an atomic number of 27 to 29, X is —O— or

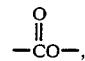

Y is a halogen atom, Z is a group capable of imparting water solubility, each of l, m and n is 0 or an integer of 1 to 3, provided that the sum of l, m and n is from 1 to 4, D is a substituted or unsubstituted phenylene or naphthylene group, R is a substituted or unsubstituted lower alkyl group, and Q is —SO$_2$CH=CH$_2$ or —SO$_2$CH$_2$CH$_2$L in which L is a group capable of being splitted by the action of alkali, which is useful for dyeing hydroxy- or amido-containing fiber materials with good build-up and level-dyeing properties to obtain a dyed product of deep blue color having excellent fastness, particularly against light, perspiration-light and chlorine.

8 Claims, No Drawings

METALLIZED FORMAZAN COMPOUNDS HAVING TWO FIBER REACTIVE GROUPS LINKED BY N-ALKYL-CONTAINING GROUP

The present invention relates to a metal formazan compound, a method for producing the same and a method for dyeing fiber materials by using the same.

More specifically, the present invention relates to a metal formazan compound, particularly a copper formazan compound, a method for producing the same and a method for dyeing fiber materials in a blue color by using the same as a fiber-reactive dye.

Reactive metal formazan dyes having a manohalogenotriazinyl group, a sulfatoethylsulfonyl group or the like as a fiber-reactive group are known. Recently, reactive dyes of this kind having two reactive groups different from each other have been developed to improve the dye performances. However, these reactive dyes are still insufficient in their dye performances such as fixing efficiency, dyeing velocity, level-dyeing property, solubility, fastness or the like.

For example, Published Unexamined Japanese Patent Application No. 4783/1981 discloses a dye of the following formula (A),

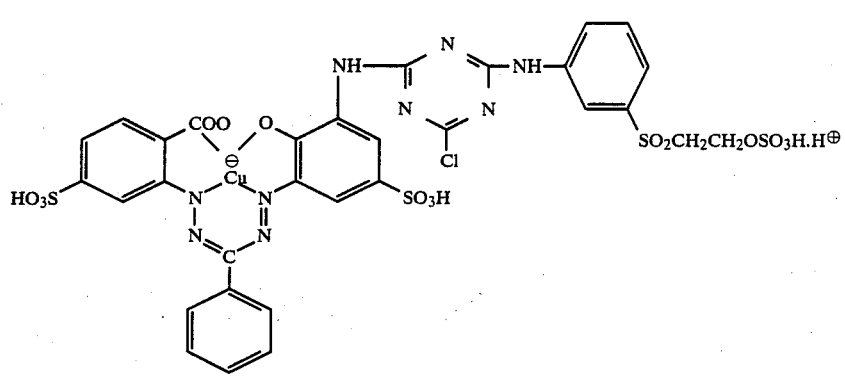

(A)

which is unsatisfactory in fixing efficiency and solubility (particularly when the sulfatoethylsulfonyl group is converted to vinylsulfonyl group by the action of alkali). U.S. Pat. No. 3,926,942 discloses a dye of the following formula (B),

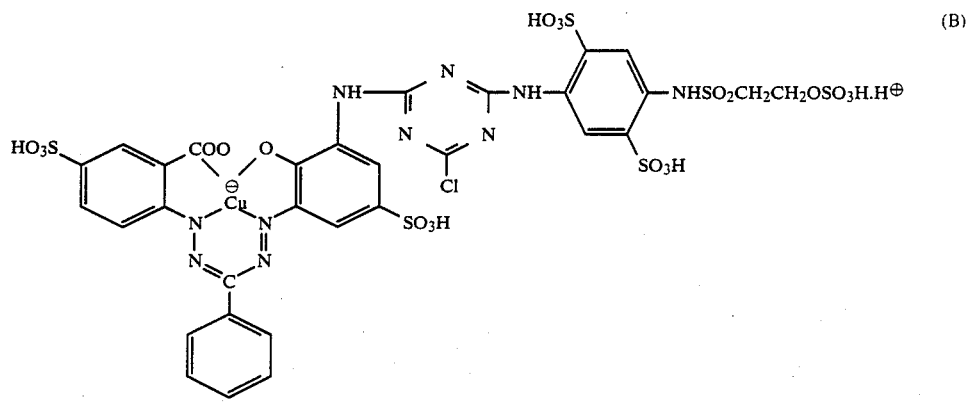

(B)

which is insufficient in the fixing efficiency as well as acid-hydrolysis fastness and reproducibility of dyed Published Unexamined Japanese Patent Application No. 12187/1980 also discloses a dye of the following formula (C),

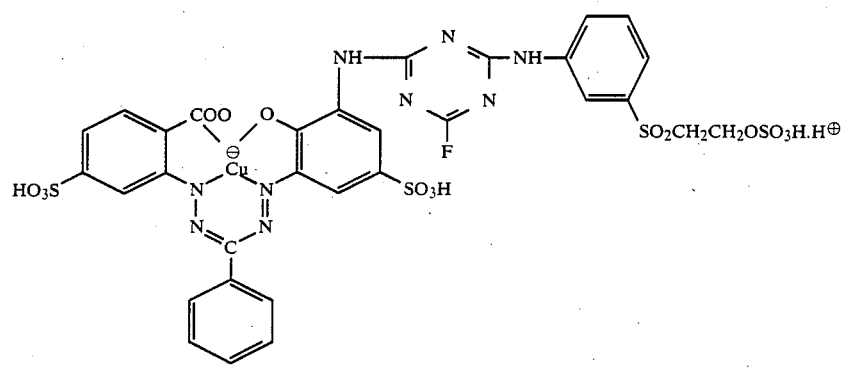

(C)

which is also insufficient in the fixing efficiency and solubility. The present inventors have studied to solve the above problems in the metal formazan reactive dyes having two reactive groups different from each other in the molecule, and found the fact that the linking group between the monohalogenotriazinyl group and the aromatic group to which the sulfatoethylsulfonyl group is appended decisively affects various dye performances, and that the problems described above can be solved by selecting a suitable linking group. The present invention provides a compound represented by a free acid of the formula (I),

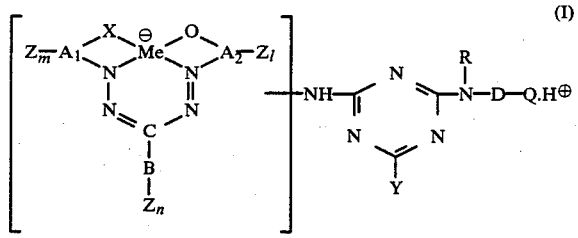

wherein $A_1$ and $A_2$ are independently a substituted or unsubstituted phenylene or naphthylene group, B is a straight or branched alkyl or alkenyl group, a phenyl group, a naphthyl group or a heterocyclic group, the alkyl, alkenyl, phenyl, naphthyl and heterocyclic group being substituted or unsubstituted, Me is an ion of metal identified by an atomic number of 27 to 29, X is —O— or

Y is a halogen atom, Z is a group capable of imparting water solubility, each of l, m and n is 0 or an integer of 1 to 3, provided that the sum of l, m and n is from 1 to 4, D is a substituted or unsubstituted phenylene or naphthylene group, R is a substituted or unsubstituted lower alkyl group, and Q is —$SO_2CH=CH_2$ or —$SO_2CH_2CH_2L$ in which L is a group capable of being splitted by the action of alkali, a method for producing the above compound of the formula (I), which comprises (1) subjecting a 1,3,5-trihalogeno-s-triazine to first-step condensation with a formazan compound of the formula (II),

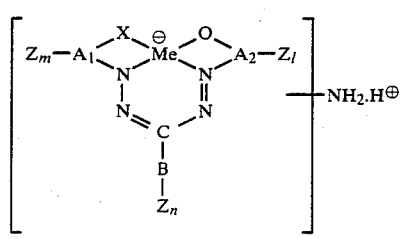

wherein $A_1$, $A_2$, B, Me, X, Z, l, m and n are as defined above, and then to second-step condensation with a compound of the formula (III),

wherein D, R and Q are as defined above, or (2) subjecting a 1,3,5-trihalogeno-s-triazine to first-step condensation with the compound of the formula (III), and then to second-step condensation with the formazan compound of the formula (II), and also a method for dyeing fiber materials, which comprises using the compound of the formula (I).

In the above formula (I), the substituent of the phenylene or naphthylene group represented by $A_1$ and $A_2$ includes a halogen atom and a nitro, $C_1$-$C_4$ alkyl, $C_1$-$C_4$ alkoxy, sulfamoyl, N-mono- or N,N-di-$C_1$-$C_4$ alkylsulfamoyl, $C_1$-$C_4$ alkylsulfonyl and phenylsulfonyl groups and the like. Of these substituted phenylene and naphthylene groups, preferred are phenylene groups substituted with one or two (preferably one) substituents selected from the group consisting of chlorine and bromine atoms and nitro, methyl, ethyl, methoxy, ethoxy, sulfamoyl and N,N-dimethylsulfamoyl groups.

The straight or branched alkyl and alkenyl groups represented by B are preferably those having 1 to 8, preferably 2 to 8, carbon atoms. The substituent which may be appended to the alkyl and alkenyl groups includes a phenyl group unsubstituted or substituted with at least one member selected from the group consisting of halogen atoms and methyl, ethyl, methoxy, ethoxy and sulfamoyl groups. The substituent of the phenyl and naphthyl groups represented by B includes a halogen atom and hydroxy, nitro, $C_1$-$C_4$ alkyl, $C_1$-$C_4$ alkoxy and carbo-$C_1$-$C_4$-alkoxy groups and the like. The heterocyclic group represented by B includes a residue of furan, thiophene, pyrrole, imidazole, indole, pyrazole, pyridine, pyrimidine, quinoline, benzimidazole or the like. To the aromatic carbon atom constituting the heterocyclic group, a chlorine atom or a phenyl, methyl, ethyl, methoxy or ethoxy group or the like may be appended, and the hydrogen atom of —NH— in the heterocyclic group may be substituted by a methyl, ethyl or benzyl group. Of these groups represented by B, preferred are phenyl groups unsubstituted or substituted with one or two members selected from the group consisting of a chlorine atom and methyl, ethyl, methoxy, ethoxy, carbomethoxy, carboethoxy and nitro groups.

Among ions of the metal identified by an atomic number of 27 to 29 represented by Me, a preferable metal ion is copper ion.

The halogen atom represented by Y includes fluorine, chlorine and bromine atoms. Of these, preferred are fluorine and chlorine atoms.

The group capable of imparting water solubility, which is represented by Z, includes sulfonic acid, carboxylic acid and phosphoric acid groups. Of these, sulfonic acid group is preferred. These groups are appended to the aromatic or aliphatic carbon atom of the phenylene, naphthylene, alkyl, alkenyl, phenyl, naphthyl or heterocyclic group represented by $A_1$, $A_2$, or B, or to that of the substituent thereof.

The substituent which may be appended to the phenylene group represented by D includes $C_1$-$C_4$ alkyl and $C_1$-$C_4$ alkoxy groups and halogen atoms. Of these, preferred are methyl, ethyl, methoxy and ethoxy groups and chlorine and bromine atoms. The substituent which may be appended to the naphthylene group represented by D includes a sulfonic acid group.

The lower alkyl group represented by R includes methyl, ethyl, propyl and butyl groups and the like. The substituent thereof includes hydroxyl, carboxy, sulfo, carbamoyl, cyano and methoxycarbonyl groups and the like. Preferred R includes methyl, ethyl, carbamoylethyl, hydroxyethyl and n- or iso-propyl groups.

Preferred X is a carbonyloxy group

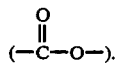

The sum of l, m and n is preferably 2 or 3.

In the case where Q in the formula (I) stands for $-SO_2CH_2CH_2L$, the group L capable of being split by the action of alkali includes a halogen atom such as chlorine and bromine atoms, an ester group of an organic carboxylic or sulfonic acid such as a lower alkanoyloxy group including acethyloxy group, a benzoyloxy group and a benzene-sulfonyloxy group, and a group represented by a free acid of the formula, $-OPO_3H_2$, $-SSO_3H$ or $-OSO_3H$. Of these groups, $-OSO_3H$ is particularly preferred. Thus, preferred Q is $-SO_2CH_2CH_2OSO_3H$, which may be partially replaced by $-SO_2CH=CH_2$.

In the formula (I), the group represented by the following formula,

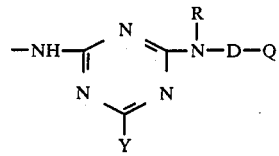

wherein Y, R, D and Q are as defined above, may be appended to any one of the aromatic or aliphatic carbon atom of the phenylene, naphthylene, alkyl, alkenyl, phenyl, naphthyl or heterocyclic group represented by $A_1$, $A_2$ or B, or to that of the substituent thereof. Of these groups to which the group of the above formula is appended, the phenylene or phenyl group is preferred.

Among the metal formazan compounds represented by the foregoing formula (I), a preferable compound is a compound represented by a free acid of the following formula,

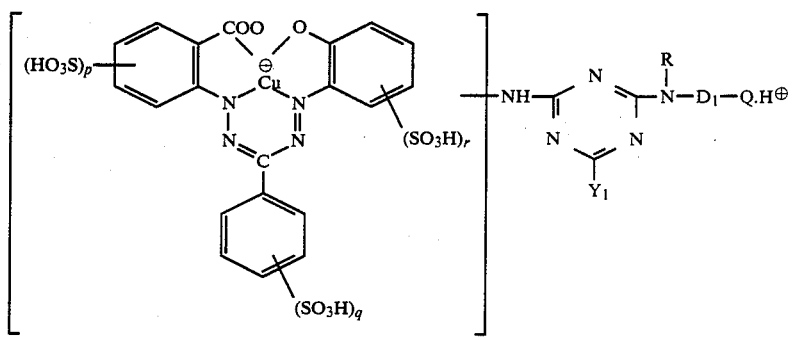

wherein R and Q are as defined above, $D_1$ is a phenylene group unsubstituted or substituted with a methyl, ethyl, methoxy or ethoxy group or a chlorine or bromine atom, or a naphthylene group unsubstituted or substituted with a sulfonic acid group, $Y_1$ is a fluorine or chlorine atom, and each of p, q and r is independently 0 or 1, provided that the sum of p, q and r is from 1 to 3. Of these, a more preferable compound is a compound represented by a free acid of the following formula

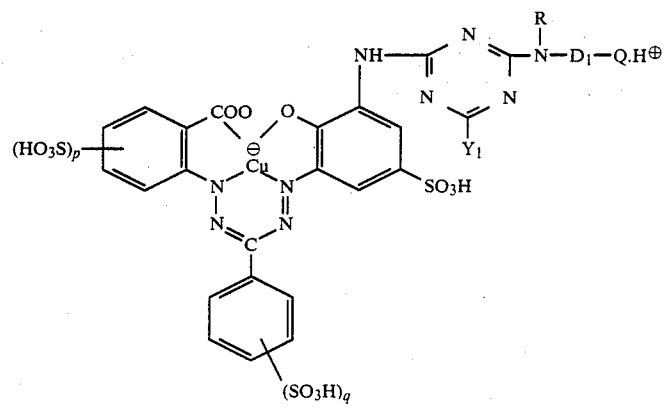

wherein R, $D_1$, Q, $Y_1$, p and q are as defined above. A still more preferable is a compound represented by a free acid of the following formula,

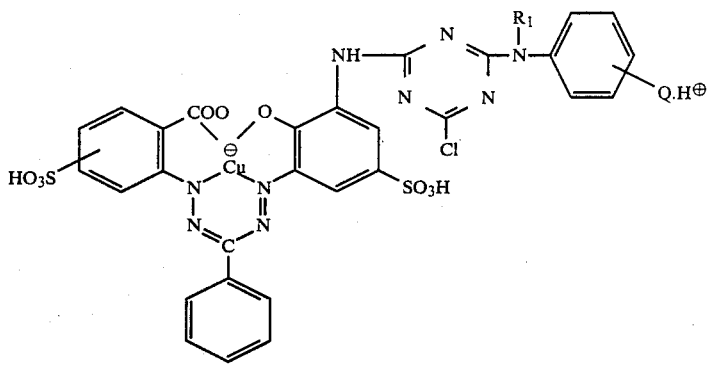

wherein Q is as defined above, and $R_1$ is a methyl group or $CH_2CH_2W$ in which W is a hydrogen atom or a methyl, ethyl, hydroxyl, carbamoyl, cyano, carboxy or sulfo group.

The metal formazan compounds described above are preferably in the form of an alkali metal or alkaline earth metal salt, more specifically sodium or potassium salt.

The metal formazan compound of the formula (I) can be produced by subjecting a 1,3,5-trihalogeno-s-triazine to first-condensation with any one of the formazan compound of the formula (II) or the compound of the formula (III), followed by second-condensation with the other.

In this process, the order of the condensation reaction is not particularly limited, and the reaction conditions are also not particularly limited. In general, the reaction may be carried out at a pH of 2 to 8, preferably 3 to 6, and at a temperature of $-5°$ to 50° C., perferably 0° to 40° C.

Considering the reaction yield and the quality of the desired metal formazan compound of the formula (I), it is preferable to carry out the first-condensation using any one compound of the formula (II) or (III) having a lower reactivity to the 1,3,5-trihalogeno-s-triazine than the other.

In the first-condensation reaction, although the reaction conditions may be determined depending on the stability of the starting compound and intermediate compound to be produced, the reaction may be carried out at a relatively low pH ranging from 2 to 4, preferably from 3 to 4, and at a relatively low temperature ranging from $-5°$ to 20° C., preferably from 0° to 10° C.

In the second-condensation reaction, the reaction conditions may be determined depending on the stability of the starting compound, the intermediate and the desired metal formazan compound. For example, the reaction may be carried out at a relatively high pH ranging from 4 to 8, preferably from 4 to 6, and at a relatively high temperature ranging from 20° to 50° C., preferably from 30° to 40° c.

The starting formazan compound of the formula (II) can be obtained from a compound represented by the formula (IV),

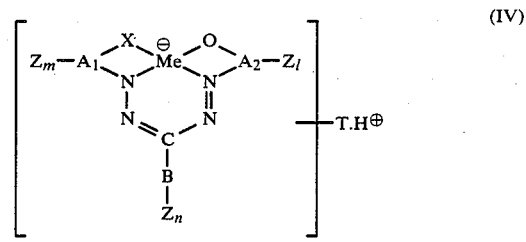

wherein $A_1$, $A_2$, B, Me, X, Z, l, m and n are as defined above, and T is a nitro ($-NO_2$), acetylamino ($-NHCOCH_3$) group or the like, which is appended to the aromatic or aliphatic carbon atom of any group represented by $A_1$, $A_2$ or B, or to that of the substituent thereof. For the preparation of the compound (II), the above compound (IV) is subjected to reduction (when $T=-NO_2$) or hydrolysis (when $T=-NHCOCH_3$) in a conventional manner.

The compound of the above formula (IV) can be prepared, for example, in the following manner.

A diazonium compound prepared by diazotizing an aromatic amine represented by the following formula (V),

wherein $A_1$, X, Z and m are as defined above, is allowed to react with a sulfite to obtain an N-sulfonic acid, the N-sulfonic acid is subjected to hydrolyzation with a mineral acid, the resulting hydrazine compound is allowed to react with an aldehyde compound represented by the formula (VI),

$Z_n$-B-CHO  (VI)

wherein B, Z and n are as defined above, to obtain a hydrozone compound, and then the hydrazone compound is subjected to coupling with a diazonium compound of an aromatic amine of the formula (VII),

wherein $A_2$, Z and l are as defined above, during or after the coupling a compound capable of imparting a metal ion (Me), such as metal sulfates, metal carbonates, metal acetates, metal salicylates, metal tartarates and metal chlorides being added thereto to form the corresponding metal complex, which is simultaneously or successively treated with an acid or an alkali, whereby the desired compound (IV) is obtained, provided that any one of the compounds (V), (VI) and (VII) to be used in the above manner has the substituent, $-NO_2$ or $-NHCOCH_3$, which is represented by T.

Examples of the aromatic amine of the formula (V) usable for the preparation of the compound (IV) are as follows:
2-Aminophenol
4- or 5-Methyl-2-aminophenol
4- or 5-Sulfo-2-aminophenol
4-Sulfo-6-carboxy-2-aminophenol
4-Methoxy-2-aminophenol
5-Methylsulfonyl-2-aminophenol
4-Mono- or dimethylsulfamoyl-2-aminophenol
5-Nitro-2-aminophenol
4-Bromo-2-aminophenol
4,6-Disulfo-2-aminophenol
2-Acetylamino-6-aminophenol-4-sulfonic acid
6-Nitro-4-sulfo-2-aminophenol
4-Nitro-6-sulfo-2-aminophenol
4-Acetylamino-6-sulfo-2-aminophenol
4-Chloro-6-sulfo-2-aminophenol
6-Chloro-4-sulfo-2-aminophenol
4-Methylsulfonyl-2-aminophenol
4-Butylsulfonyl-2-aminophenol
4-Ethylsulfonyl-2-aminophenol
4-Sulfamoyl-2-aminophenol
1-Amino-2-hydroxynaphthalene-4,6-disulfonic acid
1-Amino-2-hydroxy-6-nitronaphthalene-4-sulfonic acid
1-Amino-2-hydroxy-6-chloronapthahlene-4-sulfonic acid
2-Aminobenzoic acid
4- or 5-Sulfo-2-aminobenzoic acid
5-Nitro-2-aminobenzoic acid
4- or 5-Chloro-2-aminobenzoic acid
4-Methoxy-2-aminobenzoic acid
4- or 5-Acetylamino 2-aminobenzoic acid
2,5-Dicarboxyaniline
4-Methyl-6-sulfo-2-aminophenol Examples of the aldehyde of the formula (VI) usable for the preparation of the compound (IV) are as follows:
Benzaldehyde
2-, 3- or 4-Methylbenzaldehyde
4-Methylbenzaldehyde-3-sulfonic acid
2-, 3- or 4-Methoxybenzaldehyde
4-Methoxy-3-chlorobenzaldehyde
2- or 3-Nitrobenzaldehyde
2-Hydroxybenzaldehyde
2- or 4-Chlorobenzaldehyde
2,4-Dichlorobenzaldehyde
2-Chlorobenzaldehyde-5-sulfonic acid
Benzaldehyde-2-sulfonic acid
Benzaldehyde-3-sulfonic acid
Benzaldehyde-4-sulfonic acid
Benzaldehyde-2,4-disulfonic acid
2- or 4-Acetylaminobenzaldehyde
4-Nitrobenzaldehyde-2-sulfonic acid
3-Methyl-2- or 6-nitrobenzaldehyde
2-Chloro-6-nitrobenzaldehyde
1-Naphthoaldehyde
2-Naphthoaldehyde
Furan-2-aldehyde
Thiophene-2-aldehyde
Pyrrole-2-aldehyde
Imidazole-2-aldehyde
Pyrazole-5-aldehyde
Pyridine-2-aldehyde
Pyridine-3-aldehyde
Pyridine-4-aldehyde
Pyrimidine-5-aldehyde
Quinoline-4-aldehyde
Benzimidazole-2-aldehyde
Acetaldehyde
Propionaldehyde
Butyraldehyde
Enanthaldehyde
Acrylaldehyde
Crotonaldehyde
Phenacetaldehyde
Cinnamaldehyde Examples of the aromatic amine compound (VII) usable for the preparation of the compound (IV) are the same as those of the compound (V) excluding those having a carbonyloxy group

as X in the formula (V).

The aromatic amine represented by the foregoing formula (III) can be prepared by reacting an aromatic amine compound represented by the formula (VIII), $$H_2N-D-Q \qquad (VIII)$$

wherein D and Q are as defined above, with an alkylating agent described below, or by alkylating a precursor for the amine compound (VIII) represented by the formula (IX), $$H_2N-D-SO_2CH_2CH_2OH \qquad (IX)$$

wherein D is as defined above, in the same manner as described above, followed by esterification or halogenation in a conventional manner.

The alkylating agent includes alkyl halides, dialkylsulfuric acids, mono-substituted ethylenes and oxides, from which a suitable one may be chosen depending on the kind of R in the foregoing formula (III). Examples thereof are as follows:

The alkyl halides include, for example, methyl-, ethyl-, n- or iso- propyl-, n-, iso- or sec-butyl-bromides and iodides.

The mono-substituted ethylenes include, for example, acrylonitrile, acrylic acid, methyl or ethyl acrylate, acrylamide and vinylsulfonic acid.

The dialkylsulfuric acids include, for example, dimethylsulfuric acid and diethylsulfuric acid.

The oxides include, for example, ethylene oxide, propylene oxide, glycidol, trimethylene oxide, $\beta$-butylene oxide, 2-methyl-$\alpha$-bytylene oxide, 2-ethyl-3-methylethylene oxide, methoxyethylene oxide and n-butoxyethylene oxide.

Examples of the aromatic amine compounds (VIII) are as follows:
1-Aminobenzene-2,3- or 4-$\beta$-sulfatoethylsulfone
1-Aminobenzene-3-phosphatoethylsulfone 10 1-Amino-4-methylbenzene-3-β-sulfatoethylsulfone
1-Aminobenzene-3-β-chloroethylsulfone
1-Amino-4-methoxybenzene-3-β-sulfatoethylsulfone
1-Amino-2,5-dimethoxybenzene-4-β-sulfatoethyl
1-Amino-2-methoxybenzene-4-β-sulfatoethylsulfone
1-Amino-2-chlorobenzene-4-β-sulfatoethylsulfone
1-Amino-2-methoxybenzene-5-β-sulfatoethylsulfone
2-Aminonaphthalene-8-β-sulfatoethylsulfone
2-Aminonaphthalene-8-β-sulfatoethylsulfone-6-sulfonic acid
1-Amino-2,5-dimethoxybenzene-4-vinylsulfone
1-Amino-2-methoxy-5-methylbenzene-4-5-sulfatoethylsulfone
2-Aminonaphthalene-4-, 5-, 6- or 7-β-sulfatoethylsulfone
1-Amino-2-bromobenzene 4-β-sulfatoethylsulfone
1-Amino-2-bromobenzene-4-vinylsulfone
2-Amino-8-sulfonaphthalene-6-β-sulfatoethylsulfone
1 2-Aminonapthhalene-8-β-phosphatoethylsulfone-6-sulfonic acid
2-Aminonaphthalene-8-vinylsulfone-6-sulfonic
1-Amino-2-methoxy-5-methylbenzene-4-β-chloroethylsulfone
1-Aminobenzene-2-, 3- or 4-vinylsulfone
1-Amino-2-methoxy-5-chlorobenzene-4-β-sulfato ethylsulfone or -4-vinylsulfone
1-Amino-2-ethoxy-5-chlorobenzene-4-β-sulfatoethylsulfone or -4-vinylsulfone
2-Aminonaphthalene-6-β-sulfatoethylsulfone-1-sulfonic acid
5-Chloroaniline-2-β-sulfatoethylsulfone
5-Sulfoaniline-2-β-sulfatoethylsulfone
Aniline-2-β-thiosulfatoethylsulfone
5-Chloroaniline-2-β-thiosulfatoethylsulfone
5-Sulfoaniline-2-β-thiosulfatoethylsulfone
Aniline-2-β-phosphatoethylsulfone
5-Chloroaniline-2-β-phosphatoethylsulfone
5-Sulfoaniline-2-β-phosphatoethylsulfone
5-Chloroaniline-2-vinylsulfone
5-Sulfoaniline-2-vinylsulfone
Aniline-2-β-chloroethylsulfone
5-Chloroaniline-2-β-chloroethylsulfone
5-Sulfoaniline-2-β-chloroethylsulfone All the starting compounds described above may be used in the form of acid or salts, particularly alkali metal salts or alkaline earth metal salts.

The metal ion of the present metal formazan compound can be given as desired by selecting the kind of the starting compounds, alkali agents usable for neutralization of the acid during the formazan metal compound production steps, or electrolytes to be used when the desired compound is, if desired, isolated by salting-out.

The metal formazan compound produced in accordance with the present invention may be in a liquid form obtained by removing inorganic salts or adding a dyeing improver, if necessary, after completion of the reaction, or may be formed into a powdery product by subjecting the above liquid or the reaction mixture as such to evaporation i.e. spray-drying and the like, or into either liquid or powdery product through salting out of the desired compound in a conventional manner using an electrolyte.

The metal formazan compound of the formula (I) having two kinds of fiber reactive groups may be used as a reactive dye for dyeing hydroxyl group-, or amido group-containing materials.

The hydroxyl group-containing materials include natural or synthetic hydroxyl group-containing fiber materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amido group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a manner suitable for the reactive groups appended to the fiber-reactive dye.

For example, in the case of dyeing cellulose fiber materials, the dyeing may be carried out by an exhaustion dyeing, printing, padding including cold-pad-batch-up method or the like, from which a suitable one may be chosen depending on the property and physical form of the fibers. In these methods, an acid-binding agent such as sodium hydroxide, sodium carbonate, sodium bicarbonate, phosphates, silicates and the like may be used together with the metal formazan compound of the formula (I).

More concretely speaking, the exhaustion dyeing may be carried out at a relatively low temperature using a dye bath containing sodium hydroxide or other acid-binding agents, and sodium sulfate or sodium chloride. The printing may be carried out by preparing a dye paste containing a paste or emulsified paste such as sodium alginate and starch ether, alkalis or alkali-liberating agents such as sodium carbonate, sodium bicarbonate, sodium hydroxide, trisodium phosphate, sodium trichloroacetate and the corresponding potassium or alkaline earth metal salts, and if desired, a conventional printing assistant such as urea, and a dispersing agent, applying the dye paste on the fiber, drying and then heat-treating the printed fiber using steam. The cold-pad-batch-up method may be carried out by applying a padding solution to the fiber at ambient temperature, the padding solution comprising an acid-binding agent such as sodium hydroxide alone or a mixture of sodium hydroxide and sodium silicate, sodium carbonate or trisodium phosphate, and if necessary, a dissolving assistant such as urea, and a penetrant, batching up the fiber with a roll, allowing to stand for 3 hours or more, or overnight, and then rinsing and drying to obtain a dyed product.

The metal formazan compound of the present invention can give remarkable advantages in the dyeing of fiber materials. Particularly when used for dyeing cellulose fiber materials, the present compounds, particularly copper formazan compounds, can exhibit excellent build-up and level-dyeing properties and give a dyed product excellent in light fastness, perspiration-light fastness, abrasion fastness, wet fastness such as washing resistance, chlorine-containing water resistance, chlorine-bleaching resistance, alkali resistance, perspiration resistance and peroxide-washing resistance, acid-hydrolysis fastness and iron fastness.

Further, the present compounds are superior in dischargeability to anthraquinone dyes, and are suitable as a blue dye of three-primary color.

Furthermore, the present compounds can give a dyed product constant in the quality irrespective of change in the dyeing temperature, and exhibit high exhaustion and fixation percentages, and improved solubility in water or alkali-containing water.

The present invention is illustrated in more detail with reference to the following Examples which are only illustrative of the present invention. In Examples, parts are by weight.

copper formazan compound represented by a free acid of the following formula was obtained.

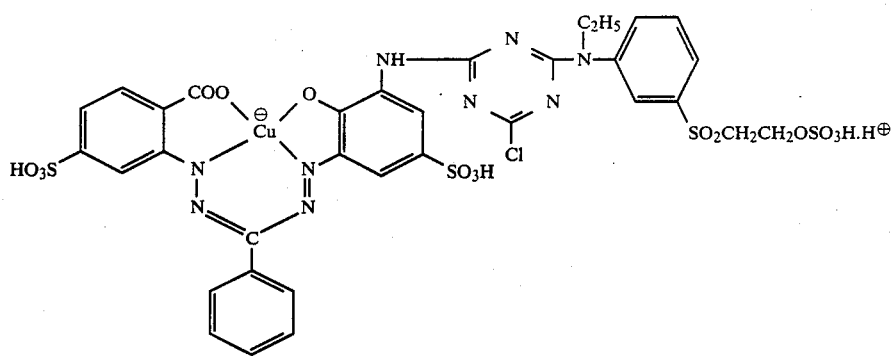

($\lambda_{max}$: 612 nm, measured in a water medium)

EXAMPLE 1

A mixture of concentrated hydrochloric acid (67 parts), 2-carboxyphenylhydrazine-5-sulfonic acid (23.2 parts) and benzaldehyde (11.0 parts) in water (100 parts) was stirred at 55° C. overnight to obtain a hydrazone compound.

On the other hand, a solution consisting of water (50 parts), 3-acetylamino-2-hydroxyaniline-5-sulfonic acid (24.6 parts) and concentrated hydrochloric acid (28.2 parts) was cooled to 0° to 10° C., and a solution of sodium nitrite (7.1 parts) in water (18 parts) was added to the above solution. The mixture was stirred for 1 to 2 hours at that temperature, and thereafter excess nitrous acid was decomposed to obtain a diazo compound.

This diazonium compound was mixed with the above hydrazone compound, and the mixture was stirred in the presence of sodium carbonate at 0° to 5° C. until the diazonium compound disappeared. The formazan-containing reaction mixture was adjusted to pH of between 5 and 6, and then mixed with crystalline copper sulfate (26.2 parts). The mixture was stirred for about 5 hours at a temperature of between 40° and 50° C. to obtain a copper complex compound, which was then isolated by salting-out using sodium chloride. The isolated compound was kept in a 3% aqueous sodium hydroxide solution for about 10 hours at 90° C. to hydrolyze the acetylamino group.

The resulting mixture was adjusted to pH of between 3 and 4, and then mixed with cyanuric chloride (16.6 parts). The mixture was stirred at a temperature of between 0° and 5° C. for 3 hours, during which the pH was controlled to between 3 and 4 using a 20% aqueous sodium carbonate solution.

To this reaction mixture was added 1—N-ethylaminobenzene-3-β-sulfatoethylsulfone (27.8 parts) which had been prepared from 1-aminobenzene-3-β-sulfatoethylsulfone and diethylsulfuric acid in a conventional manner, and then the resulting mixture was heated to 40° C. while the pH being controlled to between 5 and 6 using a 20% aqueous sodium carbonate solution, and stirred for 25 hours at this temperature. To the reaction mixture was added sodium chloride to produce crystals, which were then collected on a suction-filter, washed and then dried at 60° C. Thus, a

EXAMPLE 2

Example 1 was repeated, provided that each amine described below was used in place of 1-N-ethylamino benzene-3-β-sulfatoethylsulfone in the same molar amount as in Example 1, whereby the corresponding copper formazan compound having $\lambda_{max}$ value of 612±2 nm was

| Run No. | Amine [Compound of the formula (III)] |
|---|---|
| 1 | 1-N-Ethylaminobenzene-4-β-sulfatoethylsulfone |
| 2 | 1-N-Ethylaminobenzene-2-β-sulfatoethylsulfone |
| 3 | 1-N-Ethylamino-4-methoxybenzene-3-β-sulfatoethylsulfone |
| 4 | 1-N-Methylaminobenzene-3-β-sulfatoethylsulfone |
| 5 | 1-N-Methylaminobenzene-4-β-sulfatoethylsulfone |
| 6 | 1-N-Methylaminobenzene-2-β-sulfatoethylsulfone |
| 7 | 1-N-Methylamino-4-methoxybenzene-3-β-sulfatoethylsulfone |
| 8 | 1-N-β-Carbamoylethylaminobenzene-3-β-sulfatoethylsulfone |
| 9 | 1-N-β-Carbamoylethylaminobenzene-2-β-sulfatoethylsulfone |
| 10 | 1-N-β-Carbamoylethylaminobenzene-4-β-sulfatoethylsulfone |
| 11 | 1-N-β-Carbamoylethylamino-4-methoxybenzene-3-β-sulfatoethylsulfone |
| 12 | 1-N-n-Propylaminobenzene-3-β-sulfatoethylsulfone |
| 13 | 1-N-n-Propylaminobenzene-4-β-sulfatoethylsulfone |
| 14 | 1-N-n-Propylaminobenzene-2-β-sulfatoethylsulfone |
| 15 | 1-N-n-Propylamino-4-methoxybenzene-3-β-sulfatoethylsulfone |
| 16 | 1-N-β-Cyanoethylaminobenzene-3-β-sulfatoethylsulfone |
| 17 | 1-N-β-Cyanoethylaminobenzene-4-β-sulfatoethylsulfone |
| 18 | 1-N-β-Cyanoethylaminobenzene-2-β-sulfatoethylsulfone |
| 19 | 1-N-β-Cyanoethylamino-4-methoxybenzene-3-β-sulfatoethylsulfone |
| 20 | 1-N-β-Hydroxyethylaminobenzene-3-β-sulfatoethylsulfone |
| 21 | 1-N-β-Hydroxyethylaminobenzene-4-β-sulfatoethylsulfone |
| 22 | 1-N-β-Hydroxyethylaminobenzene-2-β-sulfatoethylsulfone |
| 23 | 1-N-β-Hydroxyethylamino-4-methoxybenzene-3-β-sulfatoethylsulfone |
| 24 | 1-N-β-Sulfoethylaminobenzene-3-β-sulfatoethylsulfone |
| 25 | 1-N-β-Methoxycarbonylethylaminobenzene-3-β-sulfatoethylsulfone |

-continued

| Run No. | Amine [Compound of the formula (III)] |
|---|---|
| 26 | 1-N-β-Carboxyethylaminobenzene-3-β-sulfatoethylsulfone |
| 27 | 1-N-Ethylamino-2-methoxybenzene-5-β-sulfatoethylsulfone |
| 28 | 1-N-Ethylamino-2,4-dimethylbenzene-5-β-sulfatoethylsulfone |
| 29 | 1-N-Ethylamino-2-methoxy-5-methylbenzene-4-β-sulfatoethylsulfone |
| 30 | 1-N-Ethylamino-4-methylbenzene-3-β-sulfatoethylsulfone |
| 31 | 2-N-Ethylaminonapthhalene-6-β-sulfatoethylsulfone |
| 32 | 2-N-Ethylamino-8-sulfonaphthalene-6-β-sulfatoethylsulfone |
| 33 | 2-N-Methylaminonaphthalene-8-β-sulfatoethylsulfone |

EXAMPLE 3

Run No. 1 of Example 2 was repeated, provided that each amine described below was used in place of 1-N-ethylaminobenzene-4-β-sulfatoethylsulfone in the same molar amount as in Run No. 1 of Example 2, whereby the corresponding copper formazan compound was obtained.

| Run No. | Amine Compound of the formula (III) |
|---|---|
| 1 | 1-N-Ethylaminobenzene-4-vinylsulfone |
| 2 | 1-N-Ethylaminobenzene-4-β-chloroethylsulfone |
| 3 | 1-N-Ethylaminobenzene-4-β-acetoxyethylsulfone |
| 4 | 1-N-Ethylaminobenzene-4-β-phosphatoethylsulfone |
| 5 | 1-N-Ethylaminobenzene-4-β-thiosulfatoethylsulfone |

EXAMPLE 4

Example 1 was repeated, provided that 2-carboxyphenylhydrazine-4-sulfonic acid was used in place of 2-carboxyphenylhydrazine-5-sulfonic acid in the s amount thereof, whereby a copper formazan compound represented by a free acid of the following formula was obtained.

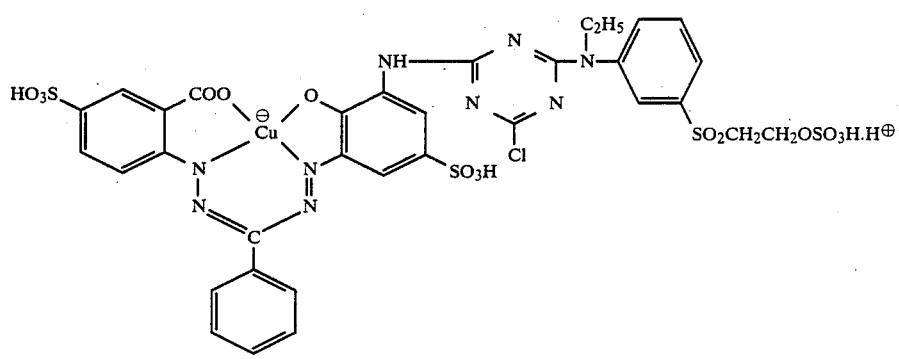

($\lambda_{max}$ = 618 nm)

EXAMPLE 5

Example 4 was repeated, provided that the same amines as those used in Run Nos. 1 to 33 of Example 2 were used respectively in place of 1-N-ethylaminobenzene-3-β-sulfatoethylsulfone, whereby the corresponding copper formazan compounds having $\lambda_{max}$ of 618±2 nm were obtained.

EXAMPLE 6

The copper formazan compound (0.1, 0.3 and 0.6 part) obtained in Example 1 was dissolved respectively in water (200 parts) to prepare each dye liquor. Sodium sulfate (10 parts) and cotton (10 parts) were added to each dye liquor, which was then heated to 60° C. At this temperature, sodium carbonate (4 parts) was added, and the dyeing was continued for 1 hour.

Thereafter, the dyed cotton was washed with water, soaped, then washed with water and dried. Thus, a dyed product of a brilliant blue color having excellent fastness, particularly excellent fastness to light, perspiration-light and chlorine with good dischargeability, was obtained.

The above formazan compound revealed good build-up and level-dyeing properties, solubility and reproducibility.

For the comparison purpose, the above dyeing was repeated, provided that a dye (A) of the formula,

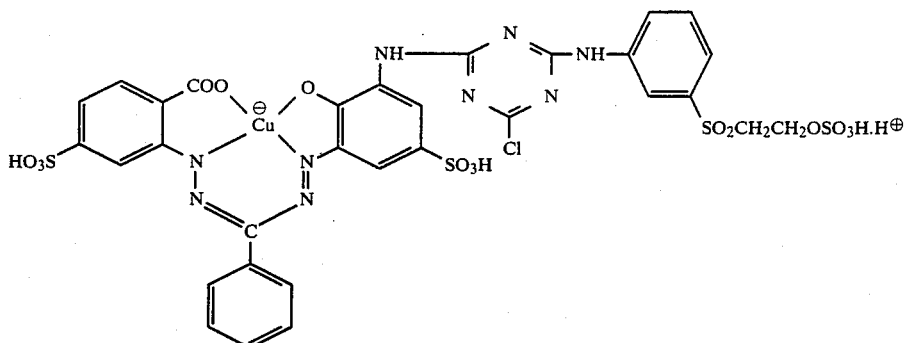

which is disclosed in Example 1 of Published Unexamined Japanese Patent Application No. 4783/1981, was used.

The results are as shown in the following Table 1.

TABLE 1

| Compound | Comparison of dyeing depth in 60° C. dyeing | | |
|---|---|---|---|
| | Dye concentration | | |
| | 1% o.w.f. | 3% o.w.f. | 6% o.w.f. |
| Compound of Example 1 | 100% | 100% | 100% |
| Dye (A) | 61% | 30% | 16% |

Dyeing depth shown in Table 1 is expressed in such a manner that the dyeing depth in dye concentration of the dyed product obtained using the dye (A) was compared with that of the dyed product obtained using the compound of Example 1, which was evaluated as 100%.

Table 1 demonstrates that the copper formazan compound of the present invention is superior in build-up property to the known dye (A).

EXAMPLE 7

The dyeing was carried out using each copper formazan compound obtained in Examples 2 to 5 in the same manner as in Example 6, whereby each compound revealed similar results.

EXAMPLE 8

A diazonium compound-containing mixture obtained by subjecting a neutral solution containing sodium 3-acetylamino-2-hydroxyaniline-5-sulfonate (24.6 parts, on the acid basis) to diazotization in a conventional manner, was added at a pH of between 12 and 13 to an aqueous solution containing a hydrazone (30.6 parts) obtained from 2-methoxy-5-sulfophenyl-hydrazine and benzaldehyde, and the resulting mixture was kept at a pH of between 12 and 13 by the addition of sodium hydroxide. After completion of the coupling reaction, to this oxy-methoxy-formazan-containing solution was poured a solution consisting of crystalline copper sulfate (25 parts), potassium sodium tartarate tetrahydrate (33.5 parts), a 40% aqueous sodium hydroxide solution (63 parts) and water (250 parts). The mixture was refluxed for 5 hours at 100° C. to effect complex formation and hydrolysis of the acetylamino group simultaneously under demethylation.

To this reaction mixture, sodium chloride and potassium chloride were added in each amount of 10% by weight based on the volume of the reaction mixture, and the mixture was cooled and then adjusted to pH 0.5 by the dropwise addition of hydrochloric acid. The aminoformazan compound formed was collected on a filter.

The product obtained was suspended in water, and the suspension was adjusted to pH 7 by the addition of sodium hydroxide, cooled to 0° C. and then mixed with cyanuric chloride (18.5 parts). The mixture was kept at a pH of between 5 and 6 using a 20% aqueous sodium carbonate solution, and then 1-N-ethylaminobenzene-3-β-sulfatoethylsulfone (27.8 parts) was added thereto. The resulting mixture was heated to 40° C. while controlling the pH to between 5 and 6 by the addition of a 20% aqueous sodium carbonate solution, and then stirred overnight at this temperature. Thereafter, the reaction mixture was mixed with sodium chloride and then filtered to separate a product, which was washed and then dried. Thus, a copper formazan compound represented by a free acid of the following formula was obtained.

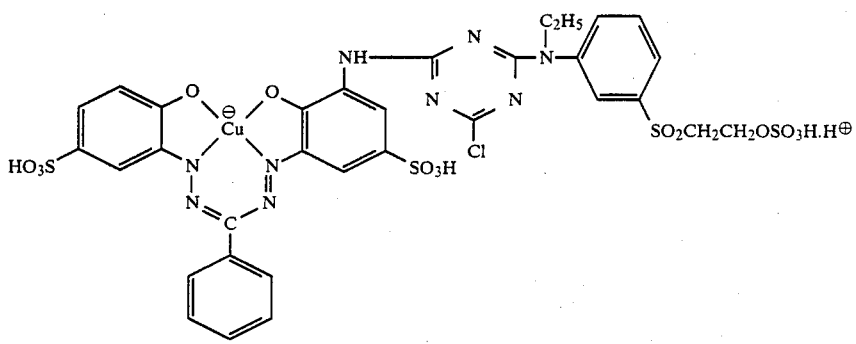

($\lambda_{max}$ = 625 nm)

EXAMPLE 9

Example 1 was repeated, provided that 2-sulfobenzaldehyde was used in place of benzaldehyde in the same molar amount as in Example 1, whereby a copper formazan compound represented by a free acid of the following formula was obtained

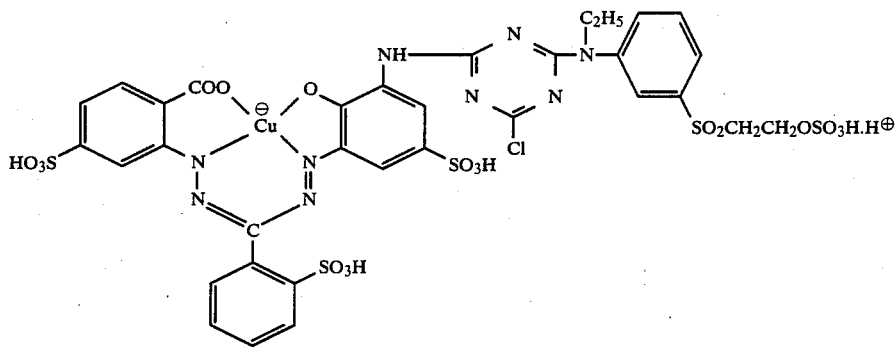

($\lambda_{max}$ = 570 nm)

EXAMPLE 10

According to the same manner as in Example 8, provided that the same amines as used in Run Nos. 1 to of Example 2 are used respectively in place of 1-N-ethylaminobenzene-3-$\beta$-sulfatoethylsulfone, each corresponding copper formazan compound can be obtained. According to the same manner as in Example 9, provided that the same amines as used in Run Nos. 1 to 33 of Example 2 are used respectively in place of 1-N-ethylaminobenzene-3-8-sulfatoethylsulfone, each corresponding copper formazan compound can be obtained.

EXAMPLE 12

The dyeing was carried out in the same manner as in Example 6, provided that the copper formazan compound of Example 8 was used, whereby a dyed product of a brilliant yellowish blue color having excellent chlorine, perspiration-light and light fastness and excellent dischargeability with high build-up property was obtained.

The above formazan compound was also found to be superior in that a dyed product constant in the quality was able to be obtained irrespective of change in the dyeing temperature.

According to the same manner as above, provided that the copper formazan compounds in Example 10 are used, similar results can be obtained.

EXAMPLE 13

The dyeing was carried out in the same manner as in Example 6, provided that the copper formazan compound obtained in Example 9 was used, whereby a dyed product of a brilliant blue color having excellent properties was obtained. Similar results can be obtained when the copper formazan compounds described in Example 11 are used.

EXAMPLE 14

Disodium salt of N-(2-carboxy-5-sulfophenyl)-N-(2'-hydroxy-3'-amino-5'-sulfophenyl)-ms-phenylformazan copper complex (59.7 parts, on the acid basis) obtained in the same manner as in Example 1 was dissolved in water (500 parts). To this solution cooled to 0° C. was dropwise added 2,4,6-trifluoro-1,3,5-triazine (13.5 parts), while controlling the pH to 6 by the addition of a 15% aqueous sodium carbonate solution. After completion of the condensation reaction, 1-N-ethylaminobenzene-3-$\beta$-sulfatoethylsulfone (27.8 parts) was added thereto. The temperature was raised to 20° C. while controlling the pH to between 5 and 6 by the addition of a 15% aqueous sodium carbonate solution, and the condensation reaction was continued at that temperature and at that pH. Sodium chloride was added to the reaction mixture to precipitate the product, which was collected on a suction-filter, washed and then dried at 40° C. Thus, a copper formazan compound represented by a free acid of the following formula was obtained.

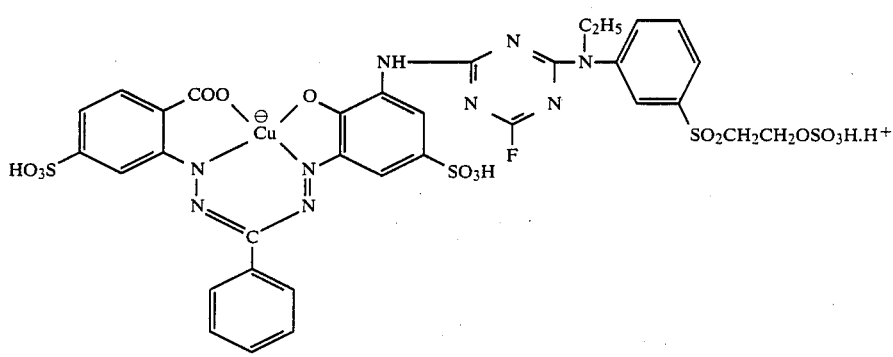

($\lambda_{max}$ = 612 nm)

EXAMPLE 15

Example 14 was repeated, provided that the N-(2-carboxy-5-sulfophenyl)-N-(2'-hydroxy-3'-amino-5'-sulfophenyl)-ms-phenylformazan copper complex and the 1-N-ethylaminobenzene-3-β-sulfatoethylsulfone were replaced with the compounds shown in the columns I [Formazan compound of the formula (II)] and II [Amine compound of the formula (III)], respectively, whereby each corresponding copper formazan compound was obtained.

EXAMPLE 16

Each copper formazan compound obtained in Examples 14 and 15 in each amount of 0.1, 0.3 and 0.6 part was dissolved in water (200 parts). Sodium sulfate (10 parts) and cotton (10 parts) were added to the dye liquor, which was then heated to 50° C. Thereafter, sodium carbonate (4 parts) was added thereto, and the dyeing was carried out for 1 hour at that temperature. The dyed cotton was washed with water, soaped, again washed with water and then dried. Thus, each dyed product of a brilliant blue color having excellent fast-

| Run No. | Column I [Formazan compond of the formula (II)] | Amine column II [Compound of the formula (III)] |
|---|---|---|
| 1 | N-(2-carboxy-4-sulfophenyl)-N-(2'-hydroxy-3'-amino-5'-sulfophenyl)-ms-phenylformazan copper complex | 1-N-Ethylaminobenzene-4-β-sulfatoethylsulfone |
| 2 | N-(2-carboxy-4-sulfophenyl)-N-(2'-hydroxy-3'-amino-5'-sulfophenyl)-ms-phenylformazan copper complex | 1-N-Ethylaminobenzene-3-β-sulfatoethylsulfone |
| 3 | N-(2-carboxy-4-sulfophenyl)-N-(2'-hydroxy-3'-amino-5'-sulfophenyl)-ms-phenylformazan copper complex | 1-N-β-Carbamoylethylaminobenzene-3-β-sulfatoethylsulfone |
| 4 | N-(2-carboxy-4-sulfophenyl)-N-(2'-hydroxy-3'-amino-5'-sulfophenyl)-ms-phenylformazan copper complex | 1-N-β-Hydroxyethylaminobenzene-3-β-sulfatoethylsulfone |
| 5 | N-(2-carboxy-4-sulfophenyl)-N-(2'-hydroxy-3'-amino-5'-sulfophenyl)-ms-phenylformazan copper complex | 1-N-n-Propylaminobenzene-3-β-sulfatoethylsulfone |
| 6 | N-(2-carboxy-4-sulfophenyl)-N-(2'-hydroxy-3'-amino-5'-sulfophenyl)-ms-phenylformazan copper complex | 1-N-Methylaminobenzene-4-β-sulfatoethylfulfone |
| 7 | N-(2-carboxy-4-sulfophenyl)-N-(2'-hydroxy-3'-amino-5'-sulfophenyl)-ms-phenylformazan copper complex | 1-N-Ethylaminobenzene-2-β-sulfatoethylsulfone |
| 8 | N-(2-carboxy-4-sulfophenyl)-N-(2'-hydroxy-3'-amino-5'-sulfophenyl)-ms-phenylformazan copper complex | 1-N-Ethylamino-4-methoxybenzene-3-β-sulfatoethylsulfone |
| 9 | N-(2-Carboxy-5-sulfophenyl)-N-(2'-hydroxy-3'-amino-5'-sulfophenyl)-ms-phenylformazan copper complex | 1-N-Ethylaminobenzene-4-βsulfatoethylsulfone |
| 10 | N-(2-Carboxy-5-sulfophenyl)-N-(2'-hydroxy-3'-amino-5'-sulfophenyl)-ms-phenylformazan copper complex | 1-N-β-Carbamoylethylaminobenzene-3-β-sulfatoethylsulfone |
| 11 | N-(2-Carboxy-5-sulfophenyl)-N-(2'-hydroxy-3'-amino-5'-sulfophenyl)-ms-phenylformazan copper complex | 1-N-β-Hydroxyethylaminobenzene-3-β-sulfatoethylsulfone |
| 12 | N-(2-Carboxy-5-sulfophenyl)-N-(2'-hydroxy-3'-amino-5'-sulfophenyl)-ms-phenylformazan copper complex | 1-N-n-Propylaminobenzene-3-β-sulfatoethylsulfone |
| 13 | N-(2-Carboxy-5-sulfophenyl)-N-(2'-hydroxy-3'-amino-5'-sulfophenyl)-ms-phenylformazan copper complex | 1-N-Methylaminobenzene-4-β-sulfatoethylsulfone |
| 14 | N-(2-Carboxy-5-sulfophenyl)-N-(2'-hydroxy-3'-amino-5'-sulfophenyl)-ms-phenylformazan copper complex | 1-N-Ethylaminobenzene-2-β-sulfatoethylsulfone |
| 15 | N-(2-Carboxy-5-sulfophenyl)-N-(2'-hydroxy-3'-amino-5'-sulfophenyl)-ms-phenylformazan copper complex | 1-N-Ethylamino-4-methoxybenzene-3-β-sulfatoethylsulfone |
| 16 | N-(2-Hydroxy-5-sulfophenyl)-N-(2'-hydroxy-3'-amino-5'-sulfophenyl)-ms-phenylformazan copper complex | 1-N-Ethylaminobenzene-3-β-sulfatoethylsulfone |
| 17 | N-(2-Hydroxy-5-sulfophenyl)-N-(2'-hydroxy-3'-amino-5'-sulfophenyl)-ms-phenylformazan copper complex | 1-N-β-Carbamoylethylamino-benzene-3-β-sulfatoethylsulfone |
| 18 | N-(2-Carboxy-5-sulfophenyl)-N-(2'-hydroxy-3'-amino-5'-sulfophenyl)-ms-2''-sulfophenylformazan copper complex | 1-N-Ethylaminobenzene-3-β-sulfatoethylsulfone |
| 19 | N-(2-Carboxy-5-sulfophenyl)-N-(2'-hydroxy-3'-amino-5'-sulfophenyl)-ms-2''-sulfophenylformazan copper complex | 1-N-βCarbamoylethylaminobenzene-3-β-sulfatoethylsulfone |
| 20 | N-(2-Carboxyphenyl)-N-(2'-hydroxy-3'-amino-5'-sulfophenyl)-ms-2''-sulfophenylformazan copper complex | 1-N-βCarbamoylethylaminobenzene-3-β-sulfatoethylsulfone |
| 21 | N-(2-Carboxyphenyl)-N-(2'-hydroxy-3'-amino-5'-sulfophenyl)-ms-2''-sulfophenylformazan copper complex | 1-N-Ethylaminobenzene-3-β-sulfatoethylsulfone | ness and dischargeability was obtained with a high build-up property. Each formazan compound was found to be superior in that a dyed product constant in the quality was able to be obtained irrespective of change in the dyeing temperature.

For the comparison purpose, the above dyeing was repeated, provided that a dye (B) of the following formula,

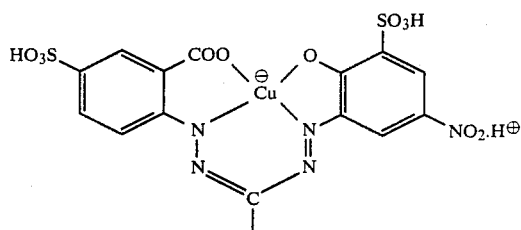

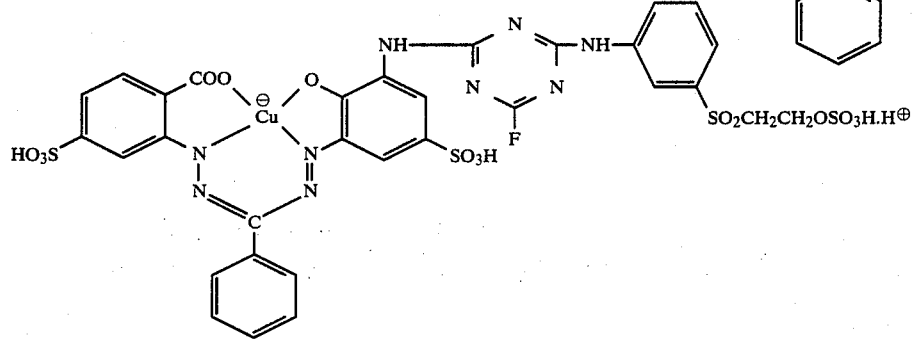

(B)

which is disclosed in Example 1, No. 80, of Published Unexamined Japanese Patent Application No. 12187/1980, was used.

From this comparison, it was found that the copper formazan compound obtained in Example 14 was superior to the known dye (B), particularly in buildup property and solubility.

EXAMPLE 17

2-Amino-4-nitrophenol-6-sulfonic acid (23.4 parts) was diazotized, and then the pH of the diazo liquor was adjusted to between 6 and 7. The hydrozone compound (32.0 parts) obtained in the same manner as in Example 4 was added to the above diazo liquor, and then an aqueous solution containing crystalline copper sulfate (26.2 parts) was added thereto. The resulting mixture was stirred for several hours at a temperature of between 0° C. and 10° C. and a pH of between 6 and 7. The reaction mixture was adjusted to a pH of about 1 using hydrochloric acid, then stirred for 1 hour, and neutralized with sodium hydroxide. Thus, a formazan compound represented by a free acid of the following formula was obtained.

This compound was subjected to hydrazine reduction in a conventional manner, converting the nitro group appended to the above compound to the amino group. The resulting amino compound was allowed to react with cyanuric chloride and 1-N-ethylaminobenzene-4-β-sulfatoethylsulfone in order in a manner similar to that of Example 1, whereby a copper formazan compound represented by a free acid of the following formula was obtained.

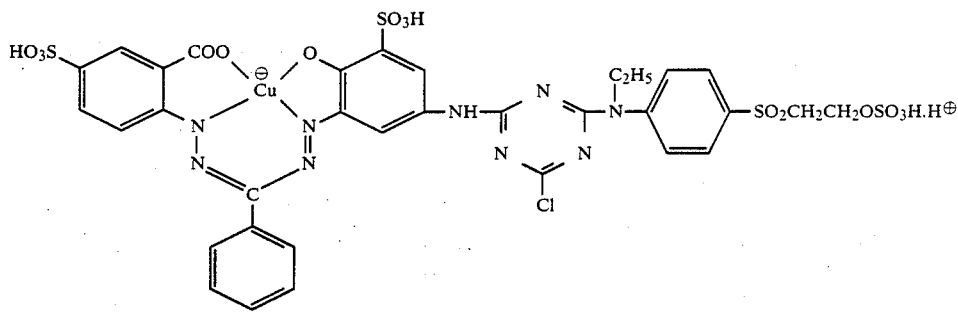

($\lambda_{max}$ = 622 nm)

EXAMPLE 18

In a manner similar to that of Example 1, a diazonium compound of 2-aminophenol-4-sulfonic acid (18.9 parts) and an aqueous solution containing crystalline copper sulfate (25 parts) were simultaneously added to a hydrozone compound (37.7 parts) obtained from 5-acetylamino-2-aminobenzoic acid and benzaldehyde-2-sulfonic acid, and the resulting mixture was kept at a temperature of between 0° and 10° C. The mixture was adjusted to a pH of between 8 and 9 and then stirred for 5 hours at that temperature. After heating to 60° C., the mixture was mixed with a 28% aqueous ammonia (100 parts), and then stirred for 2 hours to obtain a formazan compound represented by a free acid of the formula,

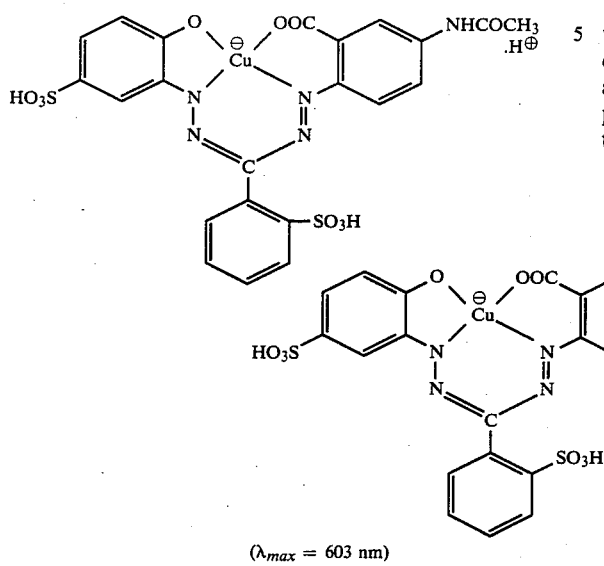

($\lambda_{max}$ = 603 nm)

This compound was subjected to alkali hydrolysis in a conventional manner, converting the acetylamino group to the amino group.

The resulting amino compound was allowed to react with cyanuric chloride and 1-N-β-carbamoyl ethylaminobenzene-3-β-sulfatoethylsulfone in order in a manner similar to that of Example 1, whereby a copper formazan compound represented by a free acid of the following formula was obtained.

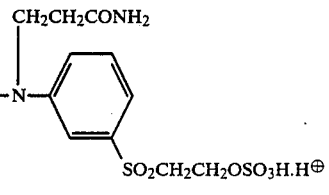

EXAMPLE 19

According to a manner similar to those of Examples 1, 17 and 18, excepting using the compounds as shown in the following table, each copper formazan compound capable of dyeing cotton fiber in a color as shown in the following table can be obtained.

| Run No. | Compound of formula (V) | Compound of formula (VI) | Compound of formula (VII) | Compound of formula (III) | Color on cellulose |
|---|---|---|---|---|---|
| 1 | 2-amino-5-sulfobenzoic acid (HO₃S—C₆H₃(NH₂)—COOH) | 2-formyl-4-nitrobenzenesulfonic acid (CHO, SO₃H, NO₂ on benzene) | 2-amino-4-sulfophenol (HO, H₂N, SO₃H on benzene) | 3-(β-sulfatoethylsulfonyl)-N-ethylaniline (C₂H₅—NH—C₆H₄—SO₂CH₂CH₂OSO₃H, meta) | Reddish blue |
| 2 | 2-amino-5-sulfobenzoic acid | 3-nitrobenzaldehyde (CHO, NO₂) | 2-amino-4-sulfophenol | 4-(β-sulfatoethylsulfonyl)-N-ethylaniline (para) | Blue |
| 3 | anthranilic acid (COOH, NH₂) | " | 2-amino-4,6-disulfophenol (HO, H₂N, SO₃H, SO₃H) | 3-(β-sulfatoethylsulfonyl)-N-methylaniline (CH₃—NH—, meta) | " |
| 4 | " | 2-chlorobenzaldehyde (CHO, Cl) | 2-acetylamino-4-sulfo-phenol-like (HO, H₂N, NHCOCH₃, SO₃H) | 3-(β-chloroethylsulfonyl)-N-(β-hydroxyethyl)aniline (CH₂CH₂OH—N(H)—C₆H₄—SO₂CH₂CH₂Cl, meta) | Reddish blue |
| 5 | 2-amino-4-methoxybenzoic acid (CH₃O, COOH, NH₂) | 4-formylbenzenesulfonic acid (CHO, SO₃H) | 2-amino-6-nitro-4-sulfophenol (HO, H₂N, NO₂, SO₃H) | 4-(β-sulfatoethylsulfonyl)-N-ethylaniline | Blue |
| 6 | 2-amino-4-acetylaminobenzoic acid (CH₃CONH, COOH, NH₂) | 3-chloro-4-formylbenzenesulfonic acid (CHO, Cl, SO₃H) | 2-amino-4-sulfophenol | 4-(β-thiosulfatoethylsulfonyl)-N-ethylaniline (SO₂CH₂CH₂SSO₃H) | " |

-continued

| Run No. | Compound of formula (V) | Compound of formula (VI) | Compound of formula (VII) | Compound of formula (III) | Color on cellulose |
|---|---|---|---|---|---|
| 7 | 2-amino-4-sulfo benzoic acid derivative (HO$_3$S, COOH, NH$_2$) | benzaldehyde (CHO) | 2-amino-4-nitro-phenol-6-sulfonic acid (HO, H$_2$N, NO$_2$, SO$_3$H) | ethylaminonaphthalene with SO$_2$CH$_2$CH$_2$OSO$_3$H and SO$_3$H | " |
| 8 | 4-carboxy-2-amino benzoic acid (HOOC, COOH, NH$_2$) | " | 2-amino-4-nitrophenol-sulfonic acid (HO, H$_2$N, NO$_2$, SO$_3$H) | N-methyl-2-(SO$_2$CH$_2$CH$_2$OSO$_3$H)aniline | Greenish blue |
| 9 | 4-acetamido-2-amino benzoic acid (CH$_3$CONH, COOH, NH$_2$) | benzaldehyde (CHO) | 2-amino-4-sulfophenol (HO, H$_2$N, SO$_3$H) | N-ethyl-2-(SO$_2$CH$_2$CH$_2$OSO$_3$H)-4-chloroaniline | " |
| 10 | " | 4-formyl-benzene-1,3-disulfonic acid (CHO, SO$_3$H, SO$_3$H) | 2-amino-4-sulfamoylphenol (HO, H$_2$N, SO$_2$NH$_2$) | 3-(2,3-dihydroxypropylamino) phenyl-SO$_2$CH$_2$CH$_2$OSO$_3$H | Reddish blue |
| 11 | " | 4-sulfobenzaldehyde (CHO, SO$_3$H) | 2-amino-4-methylsulfonylphenol (HO, H$_2$N, SO$_2$CH$_3$) | N-methyl-7-amino-naphthalene with SO$_3$H and SO$_2$CH$_2$CH$_2$O—SO$_3$H | Blue |
| 12 | " | 2-sulfobenzaldehyde (CHO, SO$_3$H) | 2-amino-4-methyl-6-sulfophenol (HO, H$_2$N, CH$_3$, SO$_3$H) | N-ethyl-4-(SO$_2$CH$_2$CH$_2$OCOCH$_3$)aniline | Reddish blue |

-continued

| Run No. | Compound of formula (V) | Compound of formula (VI) | Compound of formula (VII) | Compound of formula (III) | Color on cellulose |
|---|---|---|---|---|---|
| 13 | 2-aminobenzoic acid (COOH, NH₂) | benzaldehyde (CHO) | 2-amino-4-nitro-phenol-5-sulfonic acid (OH, NH₂, NO₂, SO₃H) | 3-(N-(2-carboxyethyl)amino)phenyl vinyl sulfone (CH₂CH₂COOH on N–H; SO₂CH=CH₂) | Blue |
| 14 | " | 3-nitrobenzaldehyde (CHO, NO₂) | 2-amino-phenol-3,5-disulfonic acid (OH, NH₂, SO₃H, SO₃H) | 3-(N-(2-carbamoylethyl)amino)phenyl vinyl sulfone (CH₂CH₂CONH₂; SO₂CH=CH₂) | " |
| 15 | " | 4-formylbenzenesulfonic acid (CHO, SO₃H) | 2-amino-4-nitro-phenol-5-sulfonic acid (OH, NH₂, NO₂, SO₃H) | 3-(N-methylamino)phenyl 2-(phosphonooxy)ethyl sulfone (CH₃ on N–H; SO₂CH₂CH₂OPO₃H₂) | " |
| 16 | 2-amino-4-chloro-benzoic acid (COOH, NH₂, Cl) | 2-hydroxy-5-nitrobenzaldehyde-3-sulfonic acid (CHO, SO₃H, NO₂) | " | 3-(N-methylamino)phenyl vinyl sulfone (CH₃ on N–H; SO₂CH=CH₂) | " |
| 17 | 2-amino-4-chloro-benzoic acid (COOH, NH₂, Cl) | benzaldehyde (CHO) | 2-amino-4-(n-butylsulfonyl)phenol (OH, NH₂, SO₂C₄H₉) | 3-(N-(2-hydroxyethyl)amino)phenyl 2-sulfatoethyl sulfone (CH₂CH₂OH; SO₂CH₂CH₂OSO₃H) | Reddish blue |
| 18 | 4-acetylamino-2-amino-benzoic acid (CH₃CONH, COOH, NH₂) | 4-formylbenzenesulfonic acid (CHO, SO₃H) | 2-amino-4-(N-methylsulfamoyl)phenol (OH, NH₂, SO₂NHCH₃) | 3-(N-(2-carboxyethyl)amino)phenyl 2-sulfatoethyl sulfone (CH₂CH₂COOH; SO₂CH₂CH₂OSO₃H) | " |

EXAMPLE 20

In a manner similar to that of Example 6, each copper formazan compound obtained in Examples 17 and 18 was used to obtain each dyed product of a blue color having excellent fastness, particularly against light, perspiration-light and chlorine. The above compounds were also found to be superior in build-up and level-dyeing properties, solubility and reproducibility of the dyeing.

Likewise, favorable results can be obtained when the copper formazan compounds described in Example 19 are used.

What is claimed is:

1. A compound represented by a free acid of the formula,

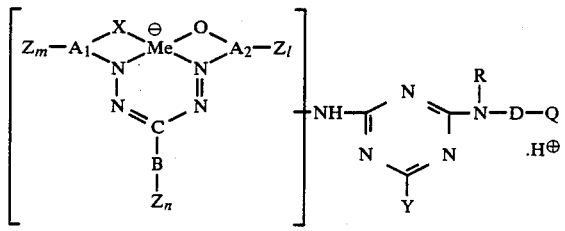

wherein $A_1$ and $A_2$ are independently phenylene unsubstituted or substituted with one substituent selected from the group consisting of chlorine, bromine, nitro, methyl ethyl, methoxy, ethoxy sulfonyl, N,N-dimethylsulfamoyl, B is phenyl unsubstituted or substituted with one or two members selected from the group consisting of chlorine, methyl ethyl, methoxy, ethoxy, carbomethoxy, carboethoxy, and nitro, Me is a copper ion, X is —O—, or

Y is fluorine or chlorine, Z is sulfonic acid, carboxylic acid or phorphoric acid, each of l, m and and n is 0 or an integer of 1 to 3, provided that the sum of l, m and n is from 2 to 3, D is phenylene unsubstituted or substituted with one or two members selected from the group consisting of methyl, ethyl, methoxy, ethoxy, chlorine and bromine, or nephthylene unsubstituted or substituted with sulfonic acid group, R is lower alkyl unsubstituted or substituted with hydroxy, carboxy, sulfo, carbamoyl, cyano or methoxycarbonyl, and Q is —SO$_2$3CH=CH$_2$ or —SO$_2$CH$_2$CH$_2$OSO$_3$H.

2. A compound represented by a free acid of the formula,

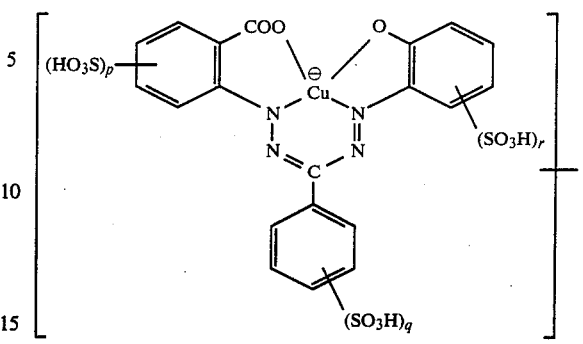

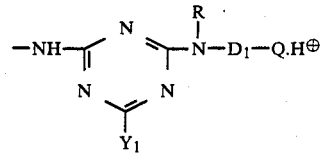

wherein R is lower alkyl unsubstituted or substituted with hydroxy, carboxy, sulfo, carbamoyl, cyano or methoxycarbonyl, $D_1$ methoxy, ethoxy, chlorine or bromine, or naphthylene unsubstituted or substituted with sulfonic acid group, Q is —SO$_2$CH=CH$_2$ or —SO$_2$CH$_2$CH$_2$OSO$_3$H, $Y_1$ is fluorine or chlorine, and each of p, q and r is 0 or 1, provided that the sum of p, q and r is from 2 to 3.

3. A compound represented by the free acid of the formula,

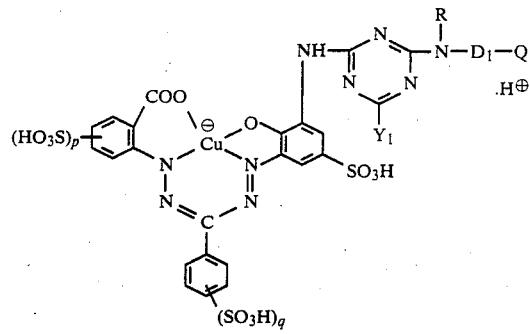

wherein R is lower alkyl unsubstituted or substituted with hydroxy, carboxy, sulfo, carbamoyl, cyano or methoxycarbonyl, $D_1$ is phenylene unsubstituted or substituted with methyl, ethyl, methoxy, ethoxy group, chlorine or bromine, or naphthylene unsubstituted or substituted with sulfonic acid group, Q is —SO$_2$CH=CH$_2$ or —SO$_2$CH$_2$CH$_2$OSO$_3$H, $Y_1$ is a fluorine or chlorine atom, and each of p and q is 0 or 1.

4. A compound represented by a free acid of the formula,

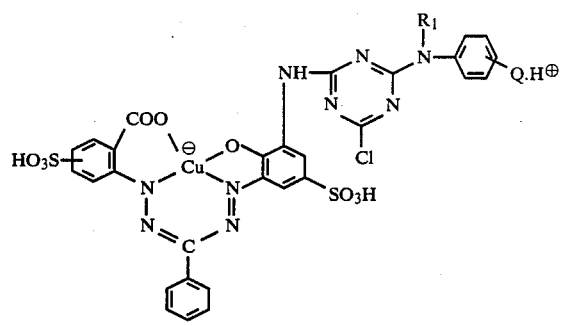
wherein $R_1$ is a methyl, ethyl, carbamoylethyl, hydroxyethyl or n- or iso-propyl group, and Q is —$SO_2CH=CH_2$ $SO_2CH_2CH_2OSO_3H$.
5. A compound represented by a free acid of the formula,
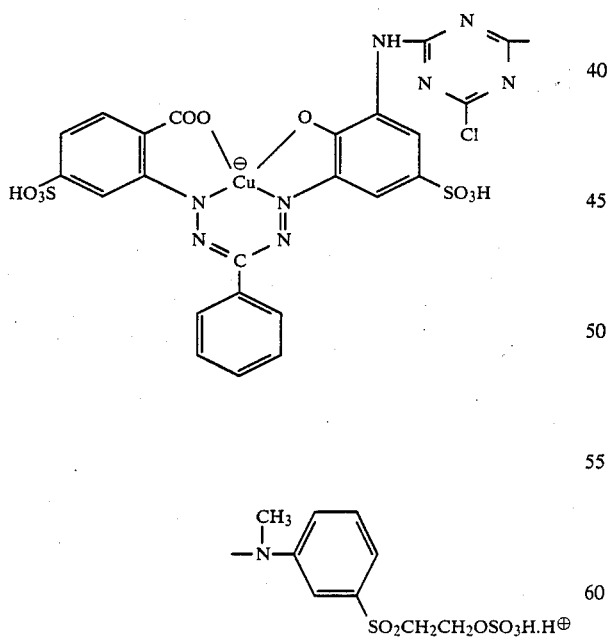
6. A compound represented by a free acid of the formula,
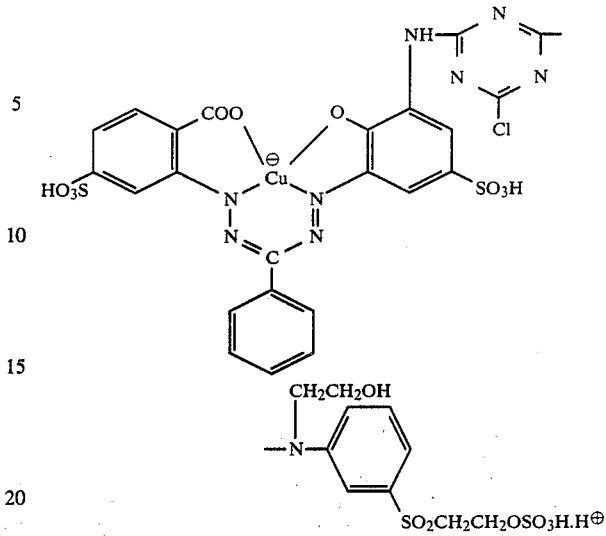
7. A compound represented by a free acid of the formula,
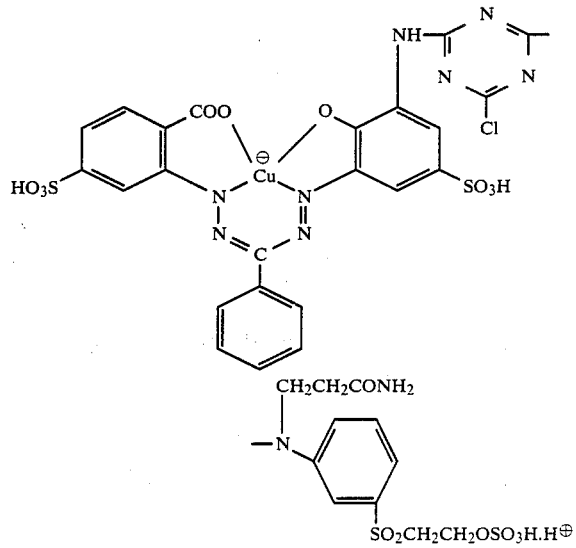
8. A compound represented by a free acid of the formula,
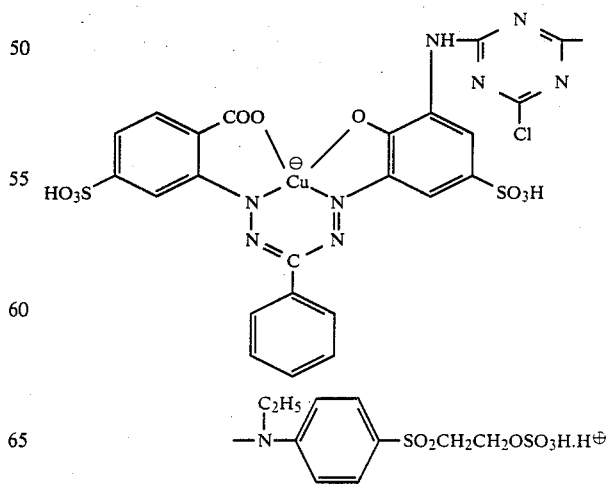
* * * * *